United States Patent [19]
Shawl et al.

[11] Patent Number: 5,938,835
[45] Date of Patent: *Aug. 17, 1999

[54] CEMENT COMPOSITION

[75] Inventors: Edward T. Shawl, Wallingford; Haven S. Kesling, Jr., Drexel Hill, both of Pa.

[73] Assignee: W. R. Grace & Co.-Conn., New York, N.Y.

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/950,582

[22] Filed: Oct. 15, 1997

Related U.S. Application Data

[63] Continuation of application No. 08/807,847, Feb. 26, 1997, abandoned, which is a continuation of application No. 08/683,048, Jul. 15, 1996, abandoned, which is a continuation of application No. 08/393,182, Mar. 1, 1995, abandoned, which is a continuation-in-part of application No. 08/191,563, Feb. 3, 1994, abandoned, which is a continuation of application No. 08/121,016, Sep. 14, 1993, abandoned.

[51] Int. Cl.[6] .................................................. C04B 24/00
[52] U.S. Cl. ......................... 106/724; 106/727; 106/802; 106/823; 524/5
[58] Field of Search ................................... 106/724, 727, 106/802, 823, 819; 524/5

[56] References Cited

U.S. PATENT DOCUMENTS

| | | | |
|---|---|---|---|
| 2,307,741 | 1/1943 | Goldstein et al. | 106/90 |
| 2,776,713 | 2/1957 | Morgan et al. | 166/22 |
| 3,583,880 | 6/1971 | Moren et al. | 117/54 |
| 3,615,785 | 10/1971 | Moorer et al. | 106/724 |
| 3,642,506 | 2/1972 | Johnson | 106/644 |
| 3,663,251 | 5/1972 | Moren et al. | 106/802 |
| 4,141,737 | 2/1979 | Moon et al. | 427/136 |
| 4,204,877 | 5/1980 | Moorer et al. | 106/724 |
| 4,547,223 | 10/1985 | Goto et al. | 106/724 |
| 4,686,252 | 8/1987 | Burge et al. | 524/3 |
| 4,946,904 | 8/1990 | Akimoto et al. | 106/802 |
| 4,983,329 | 1/1991 | Cooper | 260/410.7 |
| 5,020,598 | 6/1991 | Cowan et al. | 166/293 |
| 5,162,402 | 11/1992 | Ogawa et al. | 524/5 |
| 5,174,820 | 12/1992 | Sakuta et al. | 106/724 |
| 5,181,961 | 1/1993 | Umaki et al. | 106/708 |
| 5,725,654 | 3/1998 | Shawl et al. | 106/727 |

FOREIGN PATENT DOCUMENTS

| | | | |
|---|---|---|---|
| 867321 | 3/1968 | Canada . | |
| 573036 | 6/1993 | European Pat. Off. . | |
| 554046 | 8/1993 | European Pat. Off. . | |
| 1282533 | 11/1968 | Germany . | |
| 0037259 | 4/1981 | Japan | 106/802 |
| 56-51148 | 12/1981 | Japan . | |
| 57-145054 | 9/1982 | Japan . | |
| 59-21557 | 2/1984 | Japan . | |
| 0098968 | 6/1984 | Japan | 106/802 |
| 59-128240 | 7/1984 | Japan . | |
| 9128240 | 7/1984 | Japan | 106/802 |
| 0137355 | 8/1984 | Japan | 106/802 |
| 0137383 | 8/1984 | Japan | 106/802 |
| 59-152253 | 8/1984 | Japan . | |
| 58-60293 | 10/1984 | Japan . | |
| 59-184753 | 10/1984 | Japan . | |
| 1108138 | 4/1989 | Japan . | |
| 1131041 | 5/1989 | Japan . | |
| 1226760 | 9/1989 | Japan . | |
| 2124750 | 5/1990 | Japan . | |
| 2307849 | 12/1990 | Japan . | |
| 6016844 | 1/1991 | Japan . | |
| 4130036 | 5/1992 | Japan . | |
| 4843014 | 6/1993 | Japan . | |
| 230177 | 1/1995 | Japan . | |
| 8203071 | 9/1982 | WIPO . | |

OTHER PUBLICATIONS

Shah et al., Effects of Shrinkage—Reducing Admistures On Restrained Shrinkage Cracking of Concrete, *ACI Materials Journal* May–Jun. (1992) pp. 289–295.

Ostrikov, M.S., G.D. Dibrov, T.P. Petrenko, and E.E. Gorshkova Deforming Effect of Osmotically Dehydrating liquid Media. Kolloidnyi Zhurnal, vol. 27, pp. 82–86 (1965).

*Primary Examiner*—Paul Marcantoni
*Attorney, Agent, or Firm*—Craig K. Leon; William L. Baker

[57] ABSTRACT

A cement admixture comprised of a mixture of certain alkyl ether oxyalkylene adducts with certain oxyalkylene glycols to provide cement compositions of mortar and concrete which inhibit drying shrinkage while permitting substantial air entrainment and enhanced compressive strength.

12 Claims, No Drawings

CEMENT COMPOSITION

This is a continuation of a application Ser. No. 08/807,847 filed on Feb. 26, 1997, abandoned, which is a continuation of Ser. No. 08/683,048 filed on Jul. 15, 1996, abandoned, which is a continuation of application Ser. No. 08/393,182 filed on Mar. 1, 1995, abandoned, which is a continuation-in-part of Ser. No. 08/191,563 filed on Feb. 3, 1994, abandoned, which is a continuation of Ser. No. 08/121,016 filed on Sep. 14, 1993, abandoned.

FIELD OF THE INVENTION

The present invention is directed to a cement admixture composition capable of causing the combined effects of inhibiting drying shrinkage of cement compositions while permitting substantial air entrainment to be imparted thereto. The present invention further provides an improved cement composition structural product and a method of forming same.

Specifically, the present invention is directed to a cement admixture composed of a synergistic combination of certain alkyl ether alkylene oxide adducts and oxyalkylene glycols, as fully described hereinbelow.

BACKGROUND OF THE INVENTION

Hydraulic cement compositions, such as mortar (cement, small particulate, e.g. sand, and water), or concrete (cement, small particulate, large particulate, e.g. gravel, and water), have certain properties which substantially affect their durability. These properties include shrinkage which normally occurs during drying of the cement composition and the amount of air entrained in the resultant cast cement composition's structure.

Conventional hydraulic cement compositions display a decrease in volume with setting and drying of the cast composition. Although the magnitude of the volume decrease is normally small, it is of extreme importance. This shrinkage results in cracks and other defects which lower the serviceability and durability of the resultant structure. The cracks provide a path for air to penetrate into the structure, promoting carbonation of the cement and corrosion of the metal reinforcing bars contained therein. Further, the cracks provide a means for water to seep into and through the structure. Such water entry further deteriorates the structure through freeze-thaw cycling pressures exerted on the cement structure over its life. It is highly desired to provide a cement which exhibits high strength and is not subject to deterioration effects due to shrinkage and freeze-thaw cycling.

Various attempts have been made to avoid the cracking phenomenon caused by drying shrinkage. These include providing joints in the cement structure to concentrate the site of crack formation at the joint and, thereby, minimize such formation at other portions of the structure. Such joints are expensive to install; are not applicable to certain structures such as vertical walls, pillars and the like; and merely concentrate the area of cracking but do not alleviate it.

Other attempts include varying the composition of the cement, varying the methods of manufacture of concrete mix and varying the ballast material used in forming the resultant concrete structure. None of these attempts have resulted in a satisfactory solution. For example, cements have been formulated with expansive admixtures in attempts to counter the shrinkage of the concrete. However, it is difficult to determine the proper amount of expansive admixture required to counter the drying shrinkage which develops. The use of such materials thereby gives rise to unpredictable results.

With respect to overcoming the drying shrinkage of cement compositions, such as concrete compositions, the literature teaches that various oxyalkylene adducts are suitable for this purpose. For example, U.S. Pat. Nos. 3,663,251 and 4,547,223 suggest the use of compounds of the general formula $RO(AO)_nH$ in which R may be a $C_{1-7}$ alkyl or $C_{5-6}$ cycloalkyl radical, A may be $C_2$–$C_3$ alkylene radicals and n is 1–10, as shrinkage reducing additives for cement. Similarly, U.S. Pat. No. 5,147,820 suggests terminally alkyletherified or alkylesterified oxyalkylene polymers as useful for shrinkage reduction. Still further, Japanese Patent Application 58-60293 provides the suggestion that shrinkage reduction of cement can be accomplished by the addition thereto of compounds which are aliphatic, alicyclic or aromatic group terminated oxyethylene and/or oxypropylene repeating chain compounds.

The freeze-thaw pressures encountered by conventional hydraulic cement structures on a micro-scale (including crack phenomenon) is due to seepage of water into the porous cement structure where it resides to exert deteriorating pressure under freeze-thaw conditions. In order to prevent the loss of durability due to this phenomenon, it is common practice to incorporate small amounts of agents capable of causing the entrainment of fine air voids in the hardened hydraulic cement composition structure (air entraining agents or AE agents). These air voids (normally 3–10, preferably 4–8 volume percent) provide empty space for expansive ice crystals to grow into relieving the pressure of water expansion under freeze-thaw conditions.

While oxyalkylene compounds provide a degree of shrinkage inhibition to cement structures, they have been known to cause a deactivation of conventional air entraining agents and, therefore, cause such treated cement structures to have an undesired low degree of air entrainment. It is known that air entrainment is desired to aid in permitting the cast cement structure to withstand the compression/expansion forces encountered. The oxyalkylene compounds described above have not been widely used in structural cement compositions because they do not permit the structure to have sufficient air entrainment, as required, to provide a structure capable of withstanding compressive/expansive forces and, thereby, extend the structure's useful life.

For example, U.S. Pat. No. 3,663,251 shows, by comparative examples, that the inclusion of a polypropylene glycol causes a reduction of the air entrainment exhibited by a cement treated with an agent composed of sulfite waste liquor. Further, Canadian Patent 967,321 suggests that polyoxyalkylene glycols as well as their esters, ethers and mixtures cause a reduction in foaming in cementitious compositions.

One of the main advantages of using cement compositions, such as mortar and concrete, to form architectural structural members is their ability to be cast into a desired form which is capable of exhibiting high compressive strength. With this in mind, the artisan does not desire to utilize admixtures or other ingredients which cause a decrease in such strength.

It is highly desired to provide a cement admixture which is capable of inhibiting drying shrinkage of structural cement compositions without causing a reduction in the ability of conventional air entraining agents to impart sufficient air thereto. Further, it is desired that these desired properties be achieved while retaining high compressive strength of the formed structure.

SUMMARY OF THE INVENTION

The present invention is directed to a cement admixture, a cement having the admixture incorporated therein and a method of forming an improved cement structural composition, which is capable of inhibiting drying shrinkage without detracting from the ability to substantially maintain air void content and compressive strength of the treated structure. The admixture comprises a synergistic mixture of an alkyl ether oxyalkylene adduct having the Formula (I), $RO(AO)_nH$ wherein A is selected from $C_2$–$C_4$ alkylene groups, n has a value of 1 to 3 and R is a $C_3$–$C_5$ alkyl group; in combination with lower oxyalkylene glycol compounds having the Formula (II), $HO(AO)_nH$ wherein A and n are the same as defined above.

DETAILED DESCRIPTION

It has been unexpectedly found that when the specific combination of compounds described herein is used as an admixture component one attains the desired combination of inhibition of drying shrinkage, ability to impart air entrainment using known AE agents while retaining and even improving the compressive strength of the resultant cement structure.

The present invention is specifically directed to a combination of certain alkyl ether oxyalkylene adducts and certain lower oxyalkylene glycols, as fully described hereinbelow.

The subject cement admixture requires the use of an alkyl ether oxyalkylene adduct represented by the formula $RO(AO)_nH$ wherein R represents a $C_3$–$C_5$ alkyl group such as, for example, propyl, isopropyl, n-butyl, isobutyl, sec-butyl, tertiary butyl, tertiary amyl, n-pentyl, isopentyl and the like; A represents at least one $C_2$–$C_4$ alkylene group such as, for example,

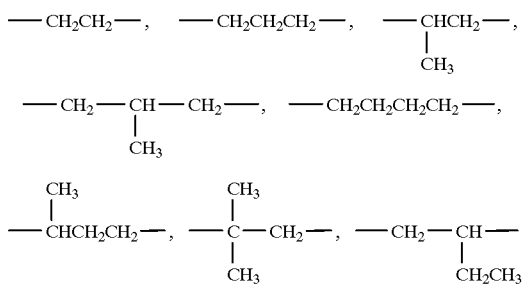

and the like and combinations thereof; O represents an oxygen atom; n represents an integer of 1 to 3. The preferred compounds of these ether adducts are those having R represent a butyl ($C_4$) group or a tertiary alkyl group such as t-butyl or t-amyl, and n is 2 or 3. In one preferred embodiment where R is a tertiary alkyl group, A represents an ethylene (—$CH_2CH_2$—) or propylene

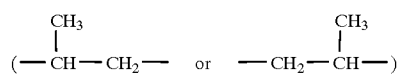

radical. In another preferred embodiment, A represents a single type of alkylene radical (i.e., $C_2$ alone, $C_3$ alone, or $C_4$ alone). In yet another desirable embodiment, A is a $C_3$ and/or $C_4$ alkylene radical (i.e., no $C_2$ alkylene radicals are present). The most preferred adducts are dipropylene glycol mono-t-butyl ether, tripropylene glycol mono-t-butyl ether, and mixtures thereof.

Polyoxyalkylene glycols are compounds known to be useful as set accelerators and shrinkage reduction additives for cements. It has now been found that certain lower oxyalkylene glycols, described below, when used in combination with the alkyl ether oxyalkylene adduct described above, free the resultant admixture from inhibiting air entrainment to be established in the treated cement composition and, further, provide cement composition products with good compressive strength.

The lower oxyalkylene glycols found useful in providing the synergistic combination of the present invention are represented by the formula $HO(AO)_nH$ wherein A, O and n have the same representation as described above with respect to the adduct. The preferred glycols are diethylene glycol and dipropylene glycol, tripropylene glycol, and mixtures thereof with dipropylene glycol being most preferred.

The most preferred admixture of the present invention is comprised of dipropylene glycol-t-butyl ether and/or tripropylene glycol t-butyl ether together with dipropylene glycol and/or tripropylene glycol.

The component of Formula II should be present in the admixture in an amount effective to provide a synergistic enhancement in drying shrinkage reduction and achieve a satisfactory degree of air entrainment in the cement composition prepared therefrom. While the optimum ratio will vary somewhat depending upon the identities of the particular components used and the cured cement properties desired, the subject cement admixture composition will generally contain component of Formula I to component of Formula II in a weight ratio of 1:2 to 10:1, preferably from 1:1 to 5:1 and more preferably from 2:1 to 4:1. The cement admixture may be neat or be composed of an aqueous solution of the admixture composition. An aqueous admixture composition preferably contains a combination of components in high concentrations of about 50 volume percent or greater although lesser concentrations may be suitable in certain instances.

The admixture composition of the present invention may be used with hydraulic cements suitable for structural application, such as ordinary, quick-hardening and moderate-heat portland cements, high alumina cements, blast-furnace slag cement and the like. Of these, portland cements of the ordinary and quick-hardening types are particularly desired and most readily used to form architectural structural members.

The improved cement of the present invention is composed of a substantially uniform mixture of a hydraulic cement and the subject cement admixture composed of at least one component of Formula I with at least one component of Formula II, which are both described above. The improved cement may be formed at any stage of the cement's formation or use, such as by applying the admixture to cement powder during the blending with other dry materials to prepare a specific type of cement. Although small amounts of water may be present during the blending, the amount of water will be insufficient to cause substantial hydration of the cement.

Alternately, an improved cement composition can be formed in situ during the course of preparing a cement composition such as a mortar mix or a concrete. The admixture composition can be added either separately or as part of the water of hydration. When the admixture is in the form of an aqueous solution, the water content of the solution should be calculated as part of the total water content of the cement composition.

The cement admixture of the present invention should be present in from about 0.1 to about 5, preferably about 0.5 to about 3 and most preferably from about 1 to about 3 weight percent based on the weight of cement in the cement composition being treated. The quantity of water used for setting the cement composition can vary within the weight ratios of water to cement of from 0.25:1 to 0.7:1, preferably 0.3:1 to 0.5:1. Aggregate, such as pebble, gravel, sand, pumice or fired perlite, as required, may be employed in conventional amounts.

Various conventional ingredients may be optionally used. Among the optionally employable ingredients are: conventional hardening accelerators, e.g. metal chlorides such as calcium chloride and sodium chloride, metal sulfates, such as sodium sulfate, and organic amines such as triethanolamine; ordinary hardening retarders, e.g. alcohols, sugars, starch and cellulose; reinforcing-steel corrosion inhibitors such as a sodium nitrate and calcium nitrite; water reducing agents and high-range water reducers such as lignosulfonic acids and their salts, and derivatives, hydroxylated carboxylic acids and their salts, condensation products of naphthalenesulfonic acids and formalin, sulfonated melamine polycondensation products, amines and their derivatives, alkanolamines, and inorganic salts such as borates, phosphates, chlorides and nitrates; super plasticizers; and the like. The quantity of such an optional ingredient or ingredients is usually 0.05–6% by weight of the cement.

The cement compositions of the present invention preferably contain at least one compound or composition capable of imparting air entrainment to the resultant cement structure. Such air entraining agents are well known and include, for example, tall oil fatty acids and their esters, gum resins and rosins, sulfite liquors and the like. The air entraining agent can be used in amounts sufficient to impart from about 4 to 10 volume percent air voids in the resultant cement structure. The exact dosage needed for a particular agent to attain a particular degree of air can be readily determined. It has been unexpectedly found that the present cement admixture does not cause a substantial deactivation of conventional air entraining additives.

The treated cement composition having the cement admixture according to the invention may be applied in conventional ways. For example, it may be troweled, filled in forms, applied by spraying, or injected by means of a caulking gun. Hardening or curing of the concrete and the like may be by any of the air drying, wet air, water and heat-assisted (steam, autoclave, etc.) curing techniques. If desired, two or more such techniques may be combined. The respective curing conditions may be the same as in the past.

The addition of the cement admixture composition of the present invention to a cement will markedly reduce the drying shrinkage of the resulting cement composition (e.g. mortar and concrete) compared with that of untreated compositions or those utilizing only one of the components. The admixture according to the invention further does not inhibit the concrete's ability to entrain air nor does it substantially reduce the strength of the product.

The following examples are given for illustrative purposes only and are not meant to be a limitation on the invention as defined by the claims appended to this specification. All parts and percentages are by weight unless otherwise indicated. The term "S/S" means weight of solid additive based on weight of hydraulic cement.

EXAMPLE 1

Drying shrinkage cracking of mortar mixes was measured using the ring test method developed by Shah et al. (ACI Materials Journal, Vol. 89, pp 289–295, 1992). A mold consisting of a 12" diameter, removable, carbon steel outer ring and a 8⅝" OD×3"×½" thick carbon steel inner ring mounted on a 12" diameter carbon steel base plate was used for the test. Test samples were placed in the mold and cured for 6 hours at 73° F. and 100% RH, then the outer ring was removed, the top of the sample was coated with a silicone-based caulk and the ring was held at 73° F. and 50% RH and monitored for crack formation.

A typical mortar mix was made using 1750 g Type I Portland cement, 3500 g sand (saturated, surface dry) and 840 g water for a water to cement ratio of 0.48 and 35 g additive for a 2% addition additive by weight based on weight of cement. The total weight of water and additive was maintained at 875 g. Results are shown in the following Table I. The restrained shrinkage test is a severe measure of drying shrinkage because of the short cure time, the hoop stress of the ring, and the drying conditions.

The results show that the admixture of the present invention (as illustrated by examples of DPTB/DPG) substantially increases the time before the ring cracked compared to similar additive levels of either component used singly.

TABLE I

Mortar Mix With Synergistic Shrinkage Reducing Agent Combinations

| Additive* | Wt % on Cement | Days to Crack |
|---|---|---|
| None[1] | | 7 days |
| DPTB[1] | 0.5 | 11 days |
| | 1 | 21 days |
| | 2 | 28 days |
| DPG[1] | 2 | 14 days |
| DPTB/DPG[2] | 1/0.5 | 34 days |
| | 1/1 | 35 days |
| | 1.5/0.5 | 48 days |

*DPTB is dipropylene glycol mono tertiary butyl ether and DPG is dipropylene glycol.
[1]Comparative example
[2]Example of the invention

EXAMPLE II

Mortar Mix with Water Reducer Added

The procedure of Example 1 was repeated except that 6.6 g (0.001%) of a commercial water reducer, a lignin sulfonate based product, Daracem 55, and 1.2 g (0.0002%) a commercial air entrainer (AE) of a gum rosin base material, Daravair M, were added to the mortar mix. Although the water reducer and air entrainer by themselves had no effect on the time to crack formation in the restrained shrinkage test, the combination of water reducer and air entrainer with DPTB and DPG gave a significant enhancement of performance.

TABLE II

Synergistic Effect of Water Reducer Combined With Shrinkage Reducing Agent Combinations

| Additive | Wt % on Cement | Days to Crack |
|---|---|---|
| None (with WR and AE) | | 6 days |
| DPTB/DPG (no WR or AE) | 1/0.5 | 34 days |
| DPTB/DPG (with WR and AE) | 1/0.5 | 44 days |

EXAMPLE 3

A series of micro-concrete samples were prepared to determine the effect on air content as well as shrinkage reduction by the subject cement admixture as well as, for comparison, the use of an alkyl ether oxyalkylene adduct alone.

The micro-concrete was formed by blending 1800 parts Type I portland cement with a mixture of the following ASTM graded aggregates: 1069 parts F-95 sand, 972 parts of C-109 sand, 972 pats of C-185 sand, and 1847 parts of 15-S sand. The dry blending was conducted in a Hobart mixer for about two minutes to attain a uniform blend having an aggregate to cement ratio of 2.7. To the blend was added 756 parts of water containing the admixture materials indicated below (liquid to cement ratio of 0.42). The blend mixed with water or aqueous admixture in the Hobart mixer for about 10 minutes to provide a micro-concrete.

Each of the formed micro-concrete compositions were poured into four to five prism molds with a square (1 inch by 1 inch) cross-section. The inner surface of each mold was pretreated to provide non-stick surfaces. Each prism was evenly filled using a vibrating table and by screening off (leveling off with a knife blade) any excess mix from the surface. Each series of molds was transferred to a fog chamber which was maintained at room temperature and 100% relative humidity to permit the sample to be initially moist cured for twenty-four hours. The samples were then removed from the fog chamber, demolded and placed in an environmental chamber maintained at 50% relative humidity and 220 C to proceed with dry curing. The length of each prism was periodically measured using a length comparator according to ASTM C-490-89 test procedure.

The above was repeated using varying ratios and dosages based on total micro-concrete components of DPTB and DPG. In each instance, with reference to samples run without admixture, they exhibited substantial reduction in shrinkage with respect to the blank as shown in Table III below.

TABLE III

| Admixture | Total Dosage | Weight Ratio DPTB/DPG | Shrinkage Reduction |
|---|---|---|---|
| Blank * | — | — | — |
| DPTB/DPG | 1.5% | 2:1 | 28% |
| DPTB/DPG | 2.0% | 2:1 | 29% |
| DPTB/DPG | 2.0% | 4:1 | 31% |

* Comparative example

The above shows that the admixtures of the invention provide significant improvement in reducing drying shrinkage in concrete formations.

Samples were formed, as described above, further including a conventional air entraining agent of tall oil fatty acid esters, Darex II, to determine the concrete's ability to contain air voids. The air content was measured according to the procedure of ASTM C-185. The results in Table IV below show that when an alkyl ether oxyalkylene adduct, DPTB, is used alone, a substantial reduction in air results even with very high dosages of air entraining agent present. However, admixtures of the present invention permit the AE agent to exhibit normal air entrainment activity.

TABLE IV

| Admixture | Dosage % | Ratio | AE Agent Dosage % (x10⁴) | W/C | Air Void % |
|---|---|---|---|---|---|
| Blank* | — | — | 45 | 0.44 | 9.5 |
| DPTB/-** | 2.0 | — | 50 | 0.45 | 4.1 |
| DPTB/--* | 2.0 | — | 200 | 0.44 | 6.5 |
| DPTB/DPG | 1.5 | 2/1 | 45 | 0.46 | 9.3 |
| DPTB/DPG | 1.5 | 4/1 | 55 | 0.46 | 9.4 |
| DPTB/DPG | 2.0 | 2/1 | 90 | 0.44 | 9.9 |

*Comparative
**Comparative. Portland cement of same type as other samples but of different lot of cement. Produced a mix of very high slump.

EXAMPLE 4

Concrete mixes were formulated with a mix design of fine aggregate equal to 1330 pounds per cubic yard West Sand, 1850 pounds per cubic yard Wrentham Crushed Stone (ASTM c-cc Grade 67), 517 pounds per cubic yard of Portland cement factor and a water (or water and indicated liquid additives) to cement ratio of 0.44. Concrete contained 0.4% by weight based on cement of a naphalene sulfonate water reducing agent (WRDA-19). The concrete mixtures were proportioned by the volumetric method according to American Concrete Institute guidelines. The concrete was mixed according to ASTM C-192 ("Making and Curing Concrete Specimens in the Laboratory"). The amount of AE agent added was sufficient to maintain air content at a substantially constant value for all formed samples. Plastic concrete tests included slump according to ASTM C-143; plastic air according to ASTM C-138; and compressive strength specimens were made according to ASTM C-192 and tested according to ASTM C-39 at various stages of cure. Three samples were tested at each stage of cure and the coefficient of variance was below 2.5% (up to 5% is considered acceptable by NVLAP (National Voluntary Laboratory Accreditation Program of NIST).

These samples were formed to show the effect the present admixture has on the compressive strength while maintaining air void values substantially constant. The results are shown in Table V.

TABLE V

| Sample | Admixture | Dosage[1] | Ratio | AE Agent[2] Dosage | w/c[3] Ratio | Slump Inches | Air % | Compressive Strength psi 4 days | 7 days | 28 days |
|---|---|---|---|---|---|---|---|---|---|---|
| 1 | Blank* | — | — | 0.65 | 0.44 | 2.5 | 3.1 | 3915 | 4135 | 5530 |
| 2 | DPTB/—* | 1.5 | — | 2.3 | 0.44 | 5.5 | 3.2 | 3595 | 4260 | 5445 |
| 3 | DPTB/DPG | 1.5% | 4:1 | 1.6 | 0.44 | 5.75 | 3.2 | 4295 | 4840 | 6475 |

*Comparative
[1]Dosage based on total weight of concrete mix
[2]AE Agent = Daravair M, a gum resin-based air entraining agent; Dosage given in oz. per hundred pounds of cement in concrete.
[3]Total liquid to cement ratio The above data show that the subject admixture, as illustrated by Sample 3 permitted satisfactory air entrainment to be achieved at lower dosages than when the alkyl ether oxyalkylene adduct DPTB is used alone. Further, both early and 28-day compressive strength are increased by about 17 percent merely by using the combination of Sample 3 in comparison to the lower values of Samples 1 and 2.

The above data shows that the combination of the adducts and glycols, as required by the present invention, provides a unique combination of properties of inhibiting shrinkage, while not substantially deactivating air entraining activity and providing enhanced compressive strength.

EXAMPLE 5

A second comparative concrete experiment was completed in the same manner as described above except that the air entraining agent was a tall oil fatty acid ester product, Darex II, instead of Daravair M and the dosage of the AE agent was maintained constant. The results, as shown in Table VI below show that the combination of the present invention does not inhibit air entrainment when compared to the blank.

TABLE VI

| Admixture | Admixture Ratio | AE Agent[4] | w/c ratio | Slump (inch) | Air % |
|---|---|---|---|---|---|
| Blank | — | — | 0.3 | 0.49 | 4 | 5 |
| DPTB/DPG | 1.5% | 4:1 | 0.3 | 0.46 | 5 | 5.8 |

[4]AE Agent = Darax II, a tall oil fatty acid ester product. Dosage given in oz. per hundred pounds cement in concrete.

Further, for comparative purposes, concrete compositions were formed by mixing 658 lbs/yd³ of Type I portland cement, 1140 lbs/yd³ of fine aggregate (sand), 1750 lbs/yd³ of coarse aggregate and water to provide a w/c ratio of 0.42. The samples were treated with Daravair M air entraining additive and DPTB (an alkyl ether oxyalkylene adduct) or higher polypropylene glycol having a molecular weight of 425 (PPG-425). The data in Table VII below shows that both materials suppress the air entraining effects of the AE agent.

TABLE VII

| Agent | Dosage | AE Agent* | Air Content % |
|---|---|---|---|
| Blank | — | 1 | 9.5 |
| DPTB | 2% | 2 | 2 |
| PPG-425 | 2% | 2 | 2 |

*Dosage in oz. per 100 lbs cement in composition.

We claim:

1. A cement admixture capable of inhibiting enhanced drying shrinkage while substantially maintaining a desired air void content of a treated cement composition caused by the presence of an air-entraining agent, comprising (a) at least one alkyl ether oxyalkylene adduct represented by the formula $$RO(AO)_nH$$

wherein A is a $C_2$–$C_4$ alkylene radical, O is an oxygen atom, R is a tertiary alkyl group and n is an integer from 1 to 3; and (b) an oxyalkylene glycol represented by the formula $$HO(AO)_mH$$

wherein A is a $C_2$–$C_4$ alkylene radical, O is an oxygen atom, and m is an integer of 1 to 3, said oxyalkylene glycol being present in an amount which is sufficient to provide shrinkage reduction in combination with said component (a) adduct and which is sufficient to offset the air-detraining effect of said component (a) adduct and thereby permit a desired degree of air-entrainment to be obtained in the set composition by the presence of an air-entraining agent 1 said oxyalkylene glycol optionally containing a mixing material selected from the group consisting of fly ash, an AE agent, an AE dehydrating agent, and an inorganic swelling agent; and said oxyalkylene adduct and said oxyalkylene glycol being used in a weight ratio of 1:2 to 10:1.

2. The admixture of claim 1 wherein said at least one alkyl ether oxyalkylene adduct of component (a) is selected from the group consisting of dipropylene glycol t-butyl ether, tripropylene glycol t-butyl ether, and mixtures thereof, and said oxyalkylene glycol of component (b) is selected from the group consisting of dipropylene glycol, tripropylene glycol, and mixtures thereof.

3. A method of inhibiting drying shrinkage of a cast hydraulic cement structure while maintaining high air content therein comprising introducing into an unset cement composition from 0.1 to 5 weight percent of the hydraulic cement, and admixture comprising:

(a) at least one alkyl ether oxyalkylene adduct represented by the formula $$RO(AO)_nH$$

wherein A is a $C_3$–$C_4$ alkylene radical, O is an oxygen atom, R is $C_3$–$C_5$ alkyl group and n is an integer from 1 to 3; and (b) an oxyalkylene glycol represented by the formula $$HO(AO)_mH$$

wherein A is a $C_2$–$C_4$ alkylene radical, O is an oxygen atom, and m is an integer of 1 to 3, said oxyalkylene glycol being present in an amount which is sufficient to provide shrinkage reduction in combination with said component (a) adduct and which is sufficient to offset the air-detraining effect of said component (a) adduct and thereby permit a desired degree of air-entrainment to be obtained in the set composition by the presence of an air-entraining agent, said alkyl ether oxyalkylene adduct and said oxyalkylene glycol being used in a weight ratio of 1:2 to 1 0: 1;

casting the cement composition comprising said admixture into a desired shape; and permitting said composition to cure.

4. The method of claim 3 wherein said R comprises a tertiary alkyl group.

5. The admixture of claim 1 further comprising at least one air entraining agent selected from the group consisting of tall oil fatty acids, tall oil fatty acid esters, gum resins, and gum rosins.

6. The composition of claim 1 wherein said air entraining agent is used in an amount sufficient to impart from about 4 to 10 volume percent air voids in the cement composition.

7. The composition of claim 1 wherein said components (a) and (b) are present in the composition in a weight ratio of from 1:1 to 5:1.

8. The composition of claim 1 further comprising a cement additive selected from the group consisting of hardening accelerators, hardening retarders, reinforcing steel corrosion inhibitors, water reducing agents, high range water reducers, and superplasticizers.

9. The composition of claim 1 further comprising an amount of an air entraining agent effective to cause at least about 3 volume percent air in the cement composition when treated and cured.

10. The composition of claim 1 wherein said composition is mixed into cement, aggregate, and water.

11. The composition of claim wherein said oxyalkylene glycol has an average molecular weight of 200 to 600.

12. A cement admixture, comprising (a) at least one alkyl ether oxyalkylene adduct represented by the formula $RO(AO)_nH$ wherein A is a $C_2$–$C_4$ alkylene radical, O is an oxygen atom, R is a tertiary alkyl group and n is an integer from 1 to 3; (b) an oxyalkylene glycol represented by the formula $HO(AO)_mH$ wherein A is a $C_2$–$C_4$ alkylene radical, O is an oxygen atom, and m is an integer of 1 to 3; said oxyalkylene adduct and said oxyalkylene glycol being used in a weight ratio of 1:2 to 10:1; and (c) an air entraining agent that is different from said alkylene adduct and said oxyalkylene glycol.

* * * * *

UNITED STATES PATENT AND TRADEMARK OFFICE
CERTIFICATE OF CORRECTION

PATENT NO. : 5,938,835
DATED : August 17, 1999
INVENTOR(S) : Edward T. Shawl, et. al.

It is certified that error appears in the above-identified patent and that said Letters Patent is hereby corrected as shown below:

Title page, item [73], Assignee: should read --ARCO CHEMICAL TECHNOLOGY, L.P.
Greenville, Delaware Signed and Sealed this Second Day of May, 2000

Attest:

Q. TODD DICKINSON

*Attesting Officer*  *Director of Patents and Trademarks*